(No Model.)
G. AMBORN, Jr.
CHAIN WRENCH.
No. 570,214.
Patented Oct. 27, 1896.
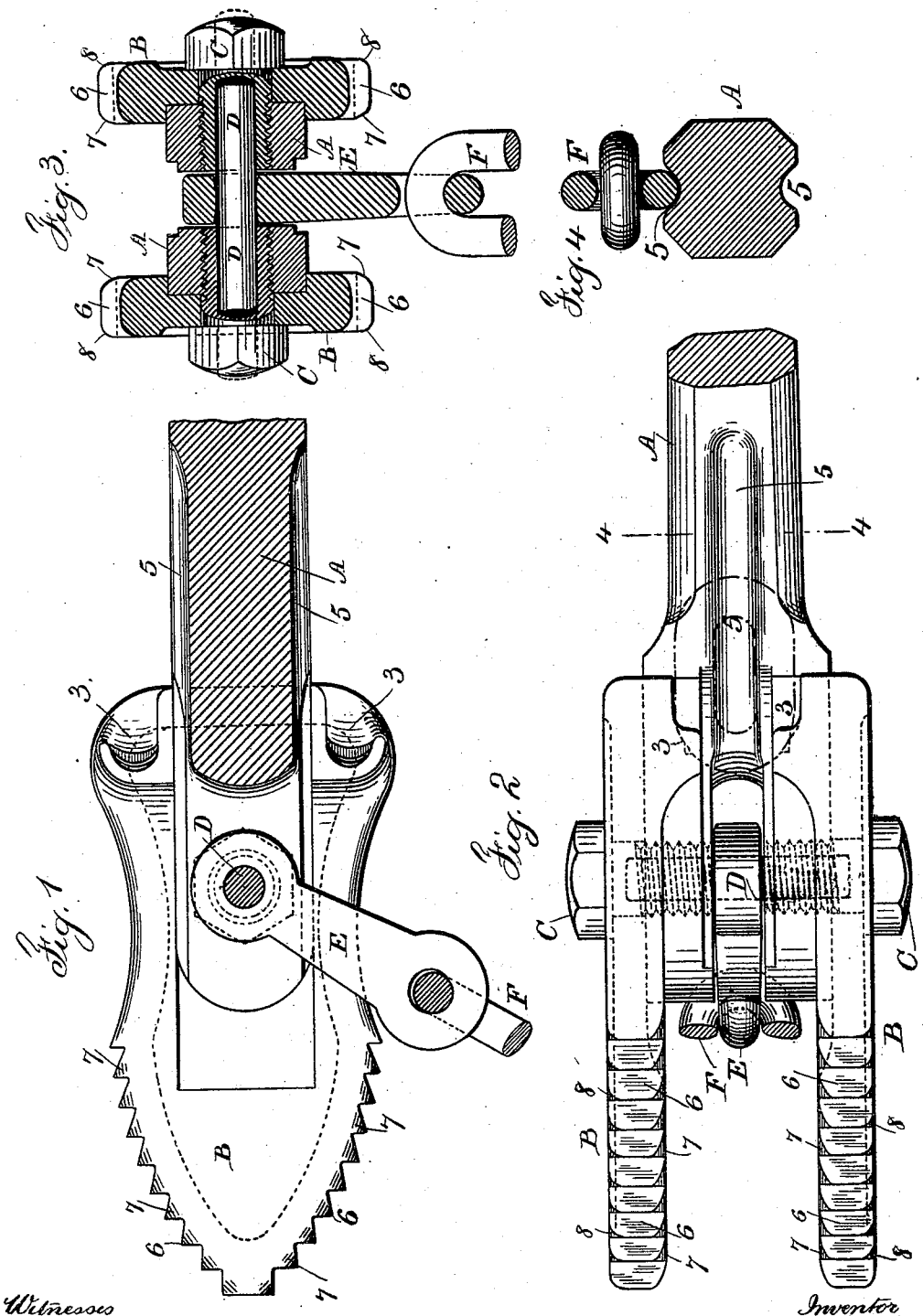
Witnesses
Chas. H. Smith
J. Staib
Inventor
George Amborn Jr
L. W. Serrell & Son
Attys

United States Patent Office.

GEORGE AMBORN, JR., OF BROOKLYN, NEW YORK, ASSIGNOR TO THE J. H. WILLIAMS & COMPANY, OF SAME PLACE.

CHAIN WRENCH.

SPECIFICATION forming part of Letters Patent No. 570,214, dated October 27, 1896.

Application filed June 1, 1896. Serial No. 593,719. (No model.)

*To all whom it may concern:*

Be it known that I, GEORGE AMBORN, Jr., a citizen of the United States, residing at Brooklyn, in the county of Kings and State of New York, have invented an Improvement in Chain Wrenches, of which the following is a specification.

Wrenches for pipes have been made with jaws at opposite sides of a handle-lever, there being serrations upon the edges of the jaws, and a chain having open elliptical links, ordinarily known as a "cable-chain," has been made use of, the chain being passed around the pipe or other circular article to be rotated and brought into engagement with projections upon the jaws. Wrenches of this character are often put to very great strain and under circumstances where the tool is liable to become injured. I have also found that the links of the chain are liable to be led across the inner ends of the serrations upon the jaws, as such chains are wrapped around the pipe or fitting to be rotated, and in consequence of the severe strain upon the parts the ends of the serrations are liable to become embedded in the chain and materially weaken the same, and in addition to this the pin that crosses through the end link of the chain to connect the same to the wrench is liable to become bent or broken, and it has been difficult to replace this pin when injured.

In my present improved wrench the inner ends of the serrations upon the jaws are rounded off or ground away, so that the chain can be laid off in a lateral direction and passed around a pipe or fitting in any desired way, and the strain upon the chain when the wrench is in use does not tend to embed the teeth in the links of the chain, because such links rest against the rounding edges of the jaw; and I also find it advantageous to round off the outer ends of the serrations to lessen the risk of the corners breaking or injuring either the pipe or the chain with which the serrations may come into contact, and in order to connect the end link of the chain to the wrench the bolts that attach the jaws to the forked handle are made tubular, and the cross-pin that passes through the end link of the chain is received into the tubular portions of these bolts, and hence the cross-pin can be made of any desired strength or quality of metal, and it is thoroughly supported by the bolts, and when worn or injured the pin can be easily removed by taking out one of the tubular bolts. Hence great facility is afforded for repairs and the wrench rendered more durable.

In the drawings, Figure 1 is a side view of one of the jaws with the handle in section. Fig. 2 is a plan view. Fig. 3 is a cross-section through the jaws and bolts, the heads of the bolts being shown in elevation; and Fig. 4 is a cross-section at the line 4 4, Fig. 2.

The handle A is forked at its end and of course is to be of any desired length, and the jaws B are connected at opposite sides of the forked ends, and these jaws are to be of any desired outline, as this feature does not compose any part of the present invention, and usually the jaws are recessed upon their inner surfaces to receive the outer surfaces of the forked end of the handle, and there are recesses 3, adapted to receive the links of the chain. These recesses are advantageously rounding, as shown, so that a link of the cable-chain can be received into such recesses, as indicated by the dotted lines in Fig. 2, the links that are adjacent to the one that is received within the recesses 3 are at right angles and their edges pass into the recesses 5 upon the surface of the handle immediately adjacent and as a continuation of the opening between the forks of the handle, and these recesses 5 have compound curved surfaces, as illustrated in Fig. 4, so that the link of the chain that is received into one of such recesses will be guided thereby and take its proper position, and there are no sharp angles or edges to the recesses, but the rounding or compound curved edges of such recesses allow the links to slip down freely into the recess without any risk of injury to the link or of the link becoming an obstruction to prevent the adjacent link properly passing into the recesses 3.

The screw-bolts C are adapted to pass through the jaws B and into the forks of the handle A, and these bolts are of the proper length, so as not to project to an appreciable extent into the mortise or opening between the forks of the handle A, and by these bolts C the jaws B are secured to the fork of the handle in the most reliable manner. Each of these bolts C is made tubular, the hole in the bolt being of a size corresponding with and adapted to receive the cross-pin D, which pin passes through the eye of the end link E, and to this link E other links F are connected, such links F being elliptical and open and of a character known as "cable links."

The cross-pin D is received into and fits comparatively tight the holes in the tubular bolts C. Hence the bolts support the pin and the pin also aids in holding the jaws in their proper relative positions and prevents the fork either spreading or closing by any lateral strain upon the jaws of the wrench, and this cross-pin D can be removed in case it becomes worn or injured by taking out one of the bolts C.

As before mentioned, the links of the cable-chain F frequently have to be led across the edges of the jaws B, as such chain is wound around a pipe or fitting, and hence when the wrench is actuated by the lever-handle the serrations or teeth 6 upon such jaws come forcibly into contact with the links of the chain and tend to embed themselves and injure such chain. This is largely prevented and the injury reduced to a minimum by rounding the ends of the teeth, as shown at 7. This may be done in the forging or by grinding when finishing up the jaws, and I find it also advantageous to round the outer ends of the teeth 6, as shown at 8, for the purposes before mentioned.

If the holes in the bolts C are bored completely through such bolts, the pin D may be made longer, as indicated by dotted lines in Fig. 3, and be held in place by riveting up the ends or otherwise, and such pin can be easily removed without loosening either bolt C.

I claim as my invention—

1. The combination with the forked handle and the jaws at the sides thereof, of screw-bolts passing through the jaws and into the fork of the handle, such screw-bolts being tubular, a cross-pin received within and supported by the tubular bolts, and a chain with an end link received between the forks of the handle and through the end of which link the cross-pin passes, substantially as set forth.

2. The combination in a chain wrench with the chain, of a handle and jaws at the ends of the handle and having serrated edges and rounding surfaces at the ends of the teeth, substantially as set forth.

3. The combination in a chain wrench, of a handle-bar forked at the end, and a cable-chain fastened at one end of the fork, jaws connected at each side with the fork of the handle-bar and having teeth at both sides and recesses in the rear portions of each jaw adapted to receive the links of the cable-chain, there being grooves in the surfaces of the handle-bar forming continuations of the fork for the links of the cable-chain, substantially as set forth.

4. The combination in a chain wrench, of a handle-bar forked at the end, jaws at the sides of the fork, tubular screws for connecting the jaws and fork, there being serrations upon the jaws with rounded corners to the teeth, a cross-pin and a cable-link chain one end of which passes into the fork of the handle-bar, and a cross-pin passing through such end link and into the tubular screws, substantially as set forth.

5. The combination in a pipe-wrench with a forked handle and jaws at the sides thereof, of tubular screw-bolts passing through the jaws and into the forked handle, and a cross-pin received within and supported by the tubular bolts, substantially as set forth.

6. The combination in a pipe-wrench, of a handle-bar forked at the end with jaws at the sides of the fork, tubular screw-bolts for connecting the jaws and fork, there being serrations upon the jaws, with rounded corners to the teeth and a cross-pin received within and supported by the tubular bolts, substantially as set forth.

Signed by me this 26th day of May, 1896.

GEORGE AMBORN, JR.

Witnesses:
WILLIAM C. REDFIELD,
GEO. M. VAN DOORN.

It is hereby certified that in Letters Patent No. 510,214, granted December 5, 1893, upon the application of Louis P. Valiquet, of New York, N. Y., for an improvement in "Type-Writing Machines," an error appears in the printed specification requiring the following correction: In lines 104–5, page 5, the words "and rounded bases" should be stricken out; and that the Letters Patent should be read with this correction therein that the same may conform to the record of the case in the Patent Office.

Signed, countersigned, and sealed this 12th day of December, A. D. 1893.

[SEAL.]
JNO. M. REYNOLDS,
*Assistant Secretary of the Interior.*

Countersigned:
JOHN S. SEYMOUR,
*Commissioner of Patents.*